United States Patent
Santoro et al.

(10) Patent No.: US 8,599,590 B2
(45) Date of Patent: Dec. 3, 2013

(54) DETECTING DEVICE FOR THE MIDPOINT VOLTAGE OF A TRANSISTOR HALF BRIDGE CIRCUIT

(75) Inventors: Christian Leone Santoro, Milan (IT); Aldo Vittorio Novelli, S. Lorenzo Parabiago (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 395 days.

(21) Appl. No.: 12/892,592

(22) Filed: Sep. 28, 2010

(65) Prior Publication Data

US 2011/0075452 A1    Mar. 31, 2011

(30) Foreign Application Priority Data

Sep. 29, 2009    (IT) .............................. MI2009A1662

(51) Int. Cl.
*H02M 7/48*    (2007.01)
*H02M 3/335*    (2006.01)
*H02M 7/523*    (2006.01)

(52) U.S. Cl.
USPC ............. 363/98; 323/285; 363/17; 363/21.02

(58) Field of Classification Search
USPC ......... 323/271, 282, 285, 287; 363/17, 21.02, 363/21.03, 56.04, 98, 132
See application file for complete search history.

(56) References Cited

U.S. PATENT DOCUMENTS

| | | | | |
|---|---|---|---|---|
| 6,172,493 | B1* | 1/2001 | Grant ............................. | 323/288 |
| 7,368,957 | B2* | 5/2008 | Clarkin et al. ................. | 327/110 |
| 7,504,868 | B2* | 3/2009 | Bodano et al. ................. | 327/108 |
| 2004/0080969 | A1* | 4/2004 | Franck .......................... | 363/132 |
| 2005/0184714 | A1* | 8/2005 | Rusu et al. .................... | 323/282 |
| 2007/0096662 | A1 | 5/2007 | Ribarich et al. | |
| 2008/0129269 | A1 | 6/2008 | Rozsypal et al. | |
| 2011/0248751 | A1* | 10/2011 | Sinow et al. ................... | 327/109 |

FOREIGN PATENT DOCUMENTS

WO    03058804 A2    7/2003

* cited by examiner

*Primary Examiner* — Adolf Berhane
*Assistant Examiner* — Fred E Finch, III
(74) *Attorney, Agent, or Firm* — Seed IP Law Group PLLC

(57) ABSTRACT

A detecting device detects the midpoint voltage of a half bridge circuit of transistors. The circuit comprises a bootstrap capacitor having one terminal connected to the midpoint node of the half bridge circuit and another terminal connected to a supply circuit. The device comprises a further capacitor connected between a second terminal of the bootstrap capacitor and circuit means adapted to form a low impedance node for a current signal circulating in said further capacitor during the transitions from the low value to the high value and from the high value to the low value of the midpoint voltage. The device comprises a detector to detect said current signal circulating in said further capacitor and to output at least a first signal indicating the transitions from the low value to the high value or from the high value to the low value according to said current signal.

18 Claims, 2 Drawing Sheets

US 8,599,590 B2

DETECTING DEVICE FOR THE MIDPOINT VOLTAGE OF A TRANSISTOR HALF BRIDGE CIRCUIT

BACKGROUND

1. Technical Field

The present disclosure relates to a detecting device for the midpoint voltage of a transistor half bridge circuit.

2. Description of the Related Art

The circuits with high voltage transistor half bridges are employed in various applications, such as motor control, ballast for fluorescent lamps and supply circuits. The half bridge circuits consist of a pair of stacked transistors placed between a high supply voltage Vin and the ground GND, as seen in FIG. 1.

The transistors Q1 and Q2 are power devices of MOSFET type and their common connection point, node "A", is the output connected to the load. Each transistor Q1 and Q2 has its driving driver DRV1 and DRV2 providing the convenient signals for switching them on or off.

In many applications, monitoring the midpoint node, node A, is convenient for determining when this switched from a high state to a low state or vice versa, such as, for example, the LLC series resonant circuit 1 in FIG. 1. During the normal operation of the circuit, the transistors Q1 and Q2 are alternately switched on and off to make the current flow into the resonant load connected to node A. When transistor Q1 is switched on, the voltage of node A is brought to the high potential, substantially the supply voltage, and so the current starts increasing in the resonant load. When transistor Q1 is switched off, the current flowing into the resonant load causes the voltage of node A to decrease towards a low potential. The transistors Q1 and Q2 are assumed to switch at a frequency which is higher than the resonance frequency of the load circuit. After a certain idle time such to ensure that the voltage of node A has decreased to a low voltage which is typically 0 volts, i.e., the ground GND, the transistor Q2 is switched on. The idle time avoids both transistors Q1, Q2 from being simultaneously switched on, which would cause a short circuit between the high and low voltages; the idle time ensures that the transition of the voltage of node A, i.e., the voltage of the midpoint node, is already over before switching on the other transistor.

The complete transition from the high to the low voltages of the voltage of node A, before switching on the transistor Q2, will employ a finite time quantity. Under certain conditions, the voltage to node A could not be completely decreased to the low potential when the transistor Q2 is switched on. In this case, transistor Q2 will force the voltage of node A to the low voltage level. This switching is called "hard-switching" and it is a switching loss that will cause the transistors Q1 and Q2 to superheat such to even irreversibly damage the two transistors.

Hence, the switching losses may be minimized thus ensuring that node A has finished the transition from the high voltage to the low voltage or vice versa before switching on the transistors.

BRIEF SUMMARY

One embodiment is a detecting device for detecting the midpoint node voltage of a transistor half bridge circuit which overcomes the above-mentioned drawback.

In accordance with one embodiment, a detecting device is provided for detecting the midpoint voltage of a transistor half bridge circuit comprising first and second transistors, said half bridge being connected between a voltage supply and a reference voltage and being adapted to drive a load, said first and second transistors being driven so that said midpoint voltage undergoes transitions from a low voltage value to a high voltage value and vice versa, said half bridge circuit comprising a bootstrap capacitor having one terminal connected to the midpoint node and the other terminal connected to a supply circuit of said bootstrap capacitor. The detecting device includes a further capacitor connected between said other terminal of said bootstrap capacitor and circuit means adapted to form a low impedance node for the current signal circulating in said further capacitor during the transitions from the low value to the high value and from the high value to the low value of the midpoint voltage, detecting means adapted to detect said current signal circulating in said further capacitor and adapted to output at least a first signal indicating the transitions from the low value to the high value or from the high value to the low value of the midpoint voltage according to said current signal.

BRIEF DESCRIPTION OF THE SEVERAL VIEWS OF THE DRAWINGS

Various embodiments will be shown by way of non-limiting example in the accompanying drawings, in which.

DETAILED DESCRIPTION

Figure 1:
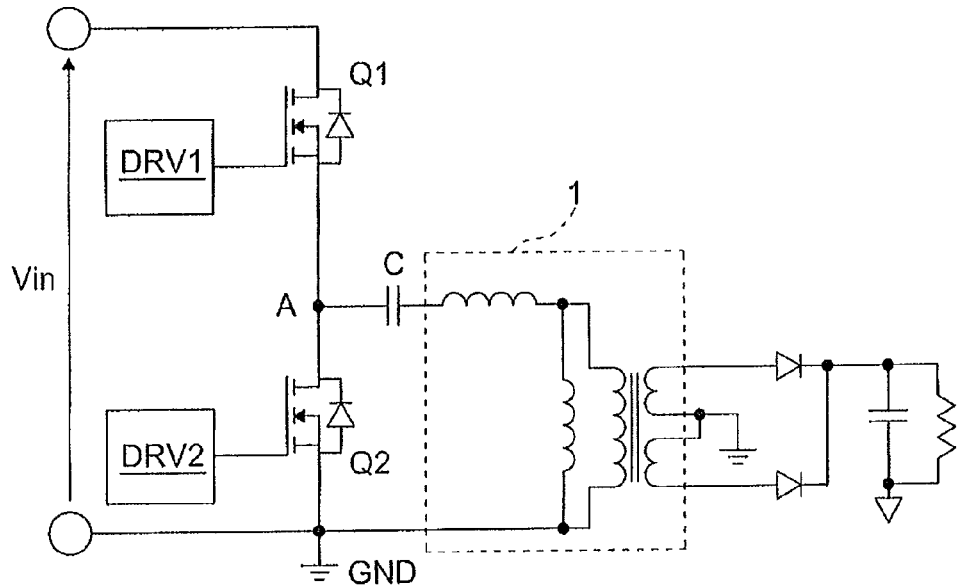
FIG. 1 is a diagram of a transistor half bridge circuit in accordance with the known art.
Figure 2:
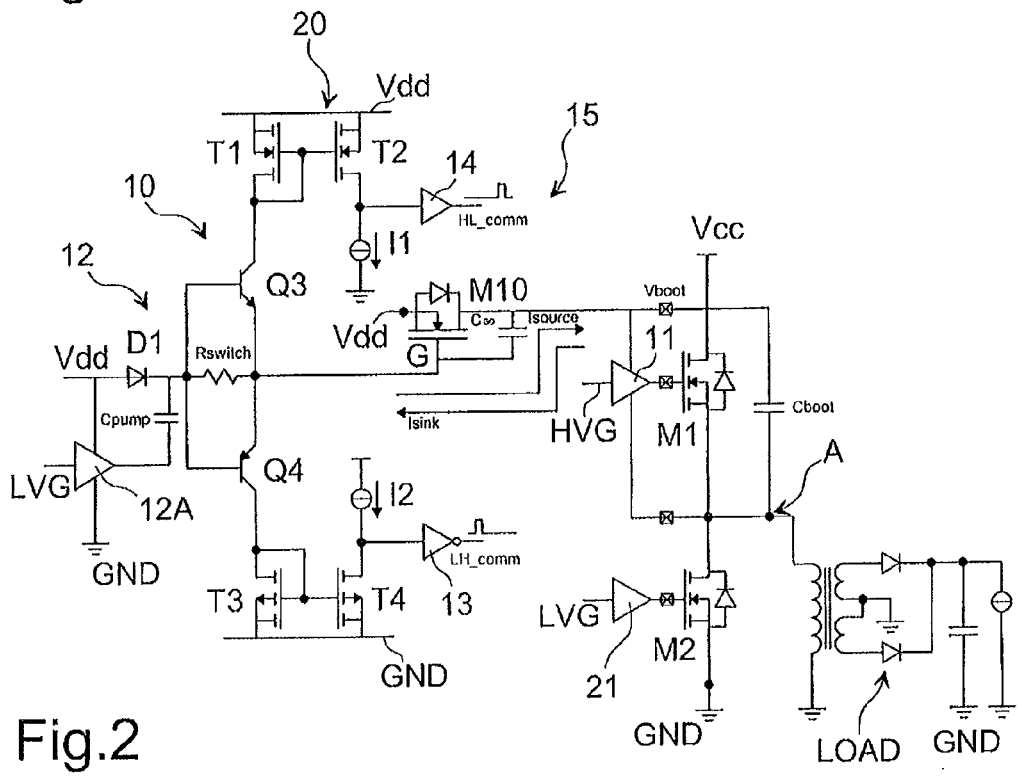
FIG. 2 is a detecting device for the midpoint voltage of a transistor half bridge circuit in accordance with one embodiment.

FIG. 2 shows a detecting device or circuit 10 for detecting the midpoint voltage of a transistor half bridge circuit in accordance with one embodiment. The figure shows a half bridge of MOS transistors M1 and M2 arranged in series between the supply voltage Vcc and the ground GND. The midpoint node A, i.e., the common terminal between the transistors M1 and M2, is connected to a load LOAD, preferably a resonant load, connected to the ground GND. The transistors M1 and M2 are driven by two drivers 11 and 21, respectively, having the input signals HVG and LVG, respectively. The drivers 11 and 21 are adapted to alternately switch on and off the transistors M1 and M2 so that when transistor M1 is on and transistor M2 is off, node A is at a high potential, substantially at the voltage Vcc, for example 400 Volts, whilst when transistor M2 is on and transistor M1 is off, node A is at a low potential, substantially at the ground voltage GND.

When transistor M1 is switched off, the current flowing into the resonant load causes the voltage of node A to decrease towards a low potential LW. The transistors M1 and M2 are assumed to switch at a frequency which is higher than the resonance frequency of the load LOAD. After a certain idle time Tm1, i.e., once the voltage of node A has been brought to a low voltage which is typically 0 volts, i.e., the ground GND, transistor M2 is switched on. The idle time Tm1 avoids both transistors M1, M2 from being simultaneously switched on, which would cause a short circuit between the high and low voltages; the idle time Tm1 ensures that the transition of the voltage of node A, i.e., the voltage of the midpoint node, is already over before switching on the other transistor M1.

Similarly, when transistor M2 is switched off, the current flowing into the resonant load causes the voltage of node A to increase towards a high potential HW. After a certain idle time Tm2, i.e., once the voltage of node A has been brought to a high voltage which is typically the supply voltage Vcc, transistor M1 is switched on. The idle time Tm2 avoids both transistors M1, M2 from being simultaneously switched on, which would cause a short circuit between the high and low voltages; the idle time Tm2 ensures that the transition of the voltage of node A, i.e., the voltage of the midpoint node, is already over before switching on the other transistor M2.

Circuit 10 is adapted to detect the voltage variations in the midpoint node A and provide logic signals at said variations, in particular it is adapted to detect the transitions from a low voltage value LW to a high voltage value HW and vice versa of the midpoint voltage Va.

The half bridge circuit normally also comprises a bootstrap capacitor Cboot connected to the midpoint node A and the circuit 10 includes a specific supply circuit 15 that supplies said bootstrap capacitor Cboot. The bootstrap capacitor allows the driving stage of the transistor M1 to be correctly supplied; in order to ensure a charge of the bootstrap capacitor Cboot in a very short time, circuit 15 should allow the supply thereof in a short time.

Circuit 10 comprises a further capacitor Cgd connected to the bootstrap capacitor Cboot, a charge pump circuit 12, and transistors Q3, Q4, which form a low impedance node for the current crossing said further capacitor Cgd during the transitions from the low value LW to the high value HW and from the high value HW to the low value LW of the midpoint voltage Va. The high voltage value HW substantially is the supply voltage Vcc whilst the low voltage value LW is a reference voltage, preferably the ground GND. Circuit 15 preferably comprises a LDMOS transistor M10 having a conduction terminal, e.g., the source terminal, connected to a voltage Vdd, e.g., 20 Volts, which is lower than the supply voltage Vcc and the other conduction terminal, the drain terminal, connected to the midpoint node A by the bootstrap capacitor Cboot. In such a case, the further capacitor is the inherent capacitor Cgd between the gate terminal and the drain terminal of the transistor M10, although a separate capacitor could be employed.

The internal charge pump circuit 12 provides a higher voltage than the supply voltage Vdd in order to correctly drive the transistor M10. The internal charge pump includes a driving circuit 12A, preferably controlled by the signal LVG; the pumping capacitor Cpump connected between the output of the driving circuit 12A and coupled to the gate terminal G of transistor M10; and a diode D1 having the anode connected to the supply voltage Vdd and the cathode coupled to the gate terminal G of the transistor M10. The pumping circuit 12 preferably comprises at least one inverter, connected between the supply voltage Vdd and the ground GND and having the output terminal connected to the capacitor Cpump; the output terminal being the common terminal of the two transistors of the inverter.

Circuit 10 exploits the inherent gate-drain capacitor Cgd of the LDMOS transistor M10 to monitor the voltage variation on node A; the capacitor Cgd is usually in the range between 0.5 and 1 pF. The coupling between the gate terminal of transistor M10 and a terminal of the capacitor Cpump and the cathode of diode D1 is achieved by a resistor Rswitch.

Circuit 10 comprises a circuit 20 that includes the bipolar transistor Q3 of the npn type, a current mirror T1-T2, comprising the p-channel MOS transistors T1 and T2, and a current generator 11. The transistor Q3 has an emitter terminal directly connected to the gate terminal G of transistor M10 and connected to a first terminal of the resistor Rswitch, a base terminal connected to a second terminal of the resistor Rswitch, and a collector terminal connected to the current generator 11 via the current mirror T1, T2. The circuit 20 also comprises a bipolar transistor Q4 of the pnp type, a current mirror T3-T4, comprising the n-channel MOS transistors T3 and T4, and a current generator 12. The transistor Q4 has an emitter terminal directly connected to the gate terminal G of transistor M10 and to the first terminal of the resistor Rswitch, a base terminal connected to the second terminal of the resistor Rswitch, and a collector terminal connected to the current generator 12 via the current mirror T3, T4. The transistors Q3 and Q4 could also consist of MOS transistors having the source terminal connected to the gate terminal G of transistor M10 and connected to the second terminal of the resistor Rswitch, the gate terminals both connected to the first terminal of the resistor Rswitch and the drain terminals connected to the current mirrors T1-T2 and T3-T4.

When a switching from the low potential to the high potential of the midpoint node A occurs, a current Isink is injected into the gate terminal G of the transistor M10 by the capacitor Cgd. Said current crosses the resistor Rswitch and flows on the capacitor Cpump that, from the point of view of the current signal, is a low impedance point and causes a voltage drop on the resistor Rswitch; this causes the bipolar transistor Q4 to be switched on, which transistor Q4 tends to divert the current Isink towards the mirror T3-T4. The current Isink is compared to the reference current I2 of the current generator I2 and provides, through an inverter I3, a high logic output signal LH_comm when the current Isink is higher than current I2.

When a switching from the high potential to the low potential of the midpoint node A occurs, a current Isource is picked up from the gate terminal G of transistor M10 by the capacitor Cgd. Said current crosses the resistor Rswitch and flows on the capacitor Cpump that, from the point of view of the current signal, is a low impedance point and causes a voltage drop on the resistor Rswitch; this causes the bipolar transistor Q3 to be switched on, which transistor Q3 tends to divert the current Isource towards the mirror T1, T2. The current Isource is compared to the reference current I1 of the current generator I1 and provides, through a digital buffer 14, a high logic output signal HL_comm when the current Isource is higher than current I1.

The signal currents Isink and Isource are proportional to the derivative of the voltage of the midpoint node A. Indeed, as one of the two bipolar transistors Q3 or Q4 is switched on when the current is injected into or picked up from the gate node G of transistor M10, the impedance seen by the current from the gate node towards the ground is relatively low, i.e., the emitting resistor of the bipolar transistor. The bootstrap capacitor Cboot, which normally has a value of about 100 nF, typically has a much higher value than the parasitic capacitor Cgd (0.5-1 pF) of the LDMOS transistor M10. Hence, the voltage Vboot across the Cboot capacitor is:

$$Vboot = Va \cdot \frac{Cboot}{Cboot + Cgd} \cong Va,$$

i.e., it is substantially equal to the voltage Va on node A.

Hence, the current Isink or Isource which is injected into or picked up from the capacitor Cgd is:

$$Isink/source = Cgd \cdot \frac{dVboot}{dt}$$

Hence, the signal currents Isink and Isource are proportional to the derivative of the midpoint voltage Va. Therefore, the logic signals LH_comm and HL_comm, which are high when the positive/negative derivative of the voltage Va exceeds a certain value determined by the reference currents I1 and I2, indicate when a transition of node A is occurring. By conveniently setting the values of the reference currents I1 and I2, the activation sensitivity of the logic signals HL_comm and LH_comm may be set to the variations of the voltage Va. Instead, the value of the resistor Rswitch determines the minimum threshold of the signal current Isink and Isource which activates the sensing circuitry.

The above-described circuit 10 may be integrated in the same chip containing the bootstrap and control circuitry, without employing additional external components and thus simplifying the final application circuit.

Figure 3:
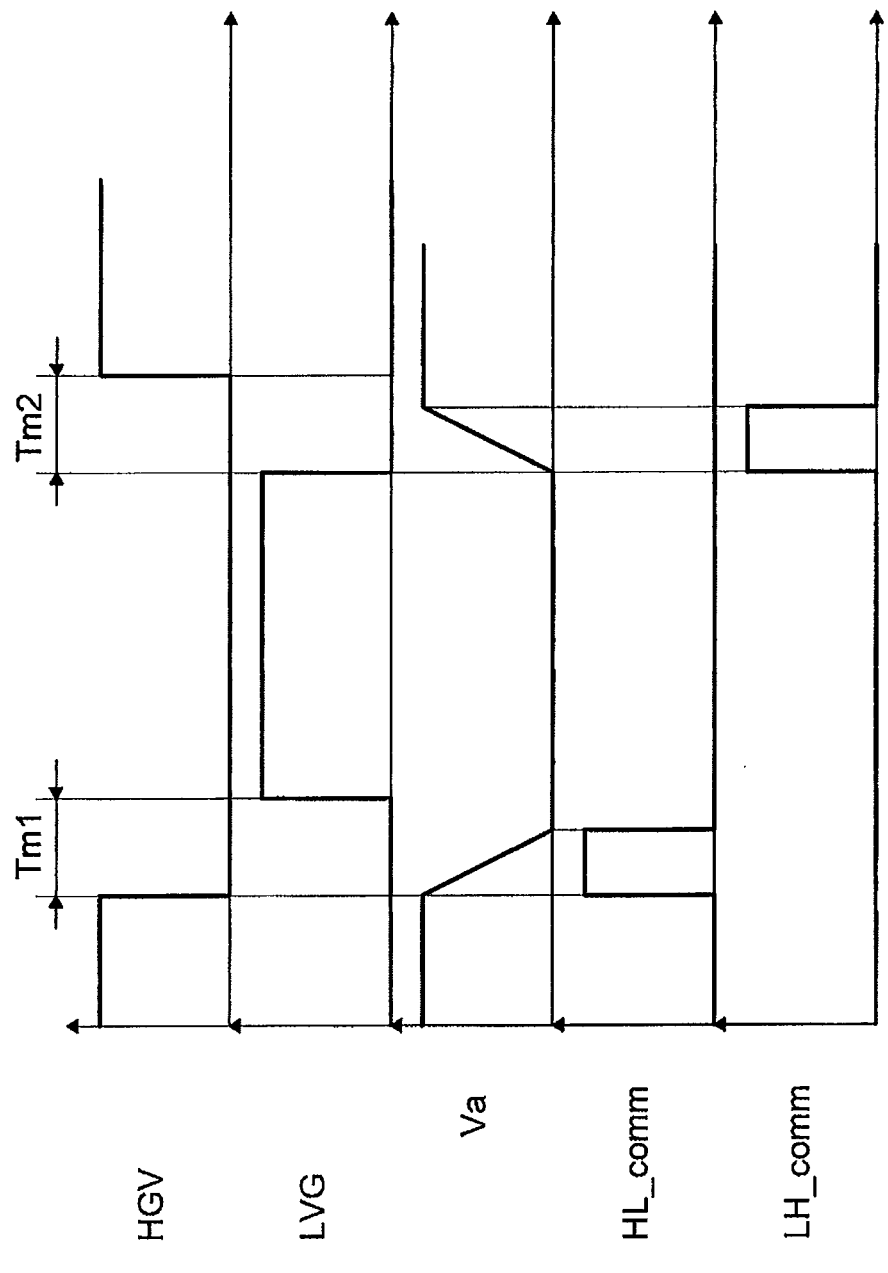
FIG. 3 shows some time charts of the relevant signals in the circuit of FIG. 2.

FIG. 3 shows the time charts of signals HVG and LVG, midpoint voltage Va and signals HL_comm and LH_comm, and the idle time periods Tm1 and Tm2.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A detecting device for detecting a voltage on the midpoint node of a half bridge circuit that includes first and second transistors coupled to each other at the midpoint node and a bootstrap capacitor having a first terminal connected to the midpoint node and a second terminal, the device comprising:
  a further capacitor configured to be coupled to said second terminal of said bootstrap capacitor;
  a detection current generation circuit including a low impedance node and configured generate a detection current, to pass the detection current to said further capacitor during transitions of the voltage on the midpoint node from a low value to a high value and to pass the detection current from said capacitor during transitions from the high value to the low value;
  a reference current generation circuit configured to generate at least a first reference current; and
  a detection circuit configured to detect said detection current, to compare the detection current to the first reference current, and to output a first signal if the detection current is greater than the first reference current, the first signal indicating the transitions of the voltage on the midpoint node from the low value to the high value or from the high value to the low value according to said detection current.

2. A device according to claim 1, wherein said detection circuit is configured to detect a direction of the detection current in response to the transitions of the voltage on the midpoint node from the low value to the high value and from the high value to the low value, respectively, and to output the first signal or a second signal according to the direction of the detection current.

3. A device according to claim 2, wherein said detection circuit comprises a resistor coupled to said further capacitor and a pair of third and fourth transistors, said third and said fourth transistors being selectively active according to the direction of the detection current.

4. A device according to claim 3, wherein the third and fourth transistors have respective control terminals both connected to a first terminal of said resistor, respective first conduction terminals both connected to a second terminal of the resistor, and respective second conduction terminals, the device further comprising:
  a first current mirror coupled to the second conduction terminal of the first transistor and configured to produce a first mirror current based on the detection current;
  a second current mirror coupled to the second conduction terminal of the second transistor and configured to produce a second mirror current based on said detection current;
  a first comparator configured to compare the first mirror current to the first reference current and to output the first signal based on the comparison; and
  a second comparator configured to compare the second mirror current to a second reference current generated by the reference current generation circuit and to output the second signal based on the comparison of the second mirror current to the second reference current.

5. A device according to claim 4, wherein the third and fourth transistors are bipolar or MOS transistors.

6. A device according to claim 1, wherein said low voltage value and said high voltage value substantially are a ground and a supply voltage, respectively.

7. A device according to claim 1, comprising:
  a supply circuit configured to supply said bootstrap capacitor and including a third transistor having a first conduction terminal configured to be connected to a voltage which is lower than a supply voltage, a second conduction terminal configured to be connected to the bootstrap capacitor, and a control terminal; and
  a pumping circuit having a pumping capacitor coupled to the control terminal of the third transistor.

8. A device according to claim 7 wherein said third transistor is an LDMOS transistor and said further capacitor is an inherent capacitor between a gate terminal and a drain terminal of said third transistor.

9. A device according to claim 7 wherein said detection current generation circuit comprises said pumping capacitor of the pumping circuit.

10. An integrated circuit comprising:
  a transistor half bridge circuit including:
  first and second transistors coupled between a supply voltage line and a reference voltage line and to one another at a midpoint node;
  a bootstrap capacitor having first and second terminals, the first terminal being connected to the midpoint node;
  a detecting device configured to detect a voltage on the midpoint node, the detecting device including:
  a further capacitor configured to be coupled to said second terminal of said bootstrap capacitor
  a detection current generation circuit including a low impedance node and configured to generate a detection current, to pass the detection current to said further capacitor during transitions of the voltage on the midpoint node from a low value to a high value and to pass the detection current from said capacitor during transitions from the high value to the low value;
  a current generation circuit configured to generate a reference current; and
  a detection circuit configured to detect said detection current, to compare the detection current to the reference current and to output a first signal if the detection current is greater than the first reference current, the first signal indicating the transitions of the voltage on the midpoint node from the low value to the high value or from the high value to the low value according to said detection current.

11. The integrated circuit of claim 10, wherein said detection circuit is configured to detect a direction of the detection current in response to the transitions of the voltage on the midpoint node from the low value to the high value and from the high value to the low value, respectively, and to output the first signal or a second signal according to the direction of the detection current.

12. The integrated circuit of claim 11, wherein said detection circuit comprises a resistor coupled to said further capacitor and to a third and a fourth transistor, said third and fourth transistors being selectively active according to the direction of the detection current.

13. The integrated circuit of claim 12, wherein the third and fourth transistors have respective control terminals both connected to a first terminal of said resistor, respective first conduction terminals both connected to a second terminal of the resistor, and respective second conduction terminals, the device further comprising:
 a first current mirror coupled to the second conduction terminal of the first transistor and configured to produce a first mirror current based on the detection current;
 a second current mirror coupled to the second conduction terminal of the second transistor and configured to produce a second mirror current based on said detection current;
 a first comparator configured to compare the first mirror current to the first reference current and to output the first signal based on the comparison; and
 a second comparator configured to compare the second mirror current to a second reference current generated by the current generation circuit and to output the second signal based on the comparison of the second mirror current to the second reference current.

14. The integrated circuit of claim 10, comprising:
a supply circuit configured to supply said bootstrap capacitor and including a third transistor having a first conduction terminal configured to be connected to a voltage which is lower than a supply voltage, a second conduction terminal configured to be connected to the bootstrap capacitor, and a control terminal; and
 a pumping circuit having a pumping capacitor coupled to the control terminal of the third transistor.

15. The integrated circuit of claim 14 wherein said third transistor is an LDMOS transistor and said further capacitor is an inherent capacitor between a gate terminal and a drain terminal of said third transistor.

16. A device comprising:
 a transistor half bridge circuit having a first power MOS transistor and a second power MOS transistor, the first and second power MOS transistors being coupled together at a midpoint node;
 a bootstrap capacitor having first and second terminals, the first terminal being coupled to the midpoint node;
 a detection current generation circuit connected to the second terminal of the bootstrap capacitor and configured to generate a detection current proportional to a change in the voltage on the midpoint node;
 a reference current generator coupled to the detection current generation circuit, the reference current generator being configured to generate a reference current; and
 a comparison circuit configured to perform a comparison of the detection current to the reference current and to output a logic signal based on the comparison of the detection current to the reference current.

17. The device of claim 16, comprising a driving circuit coupled to respective gate terminals of the first and second power MOS transistors.

18. The device of claim 17 wherein the driving circuit comprises:
 a first driver coupled to a gate of the first power MOS transistor, the first driver being configured to activate and deactivate the first power MOS transistor according to the logic signal; and
 a second driver coupled to a gate of the second power MOS transistor, the second driver being configured to activate and deactivate the second power MOS transistor according to the logic signal.

* * * * *